United States Patent
Isono

(10) Patent No.: US 10,983,021 B2
(45) Date of Patent: Apr. 20, 2021

(54) ACTION FORCE DETECTING UNIT FOR ROTARY MEMBER

(71) Applicant: TOYOTA JIDOSHA KABUSHIKI KAISHA, Toyota (JP)

(72) Inventor: Hiroshi Isono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 16/386,749

(22) Filed: Apr. 17, 2019

(65) Prior Publication Data
US 2019/0323908 A1 Oct. 24, 2019

(30) Foreign Application Priority Data
Apr. 19, 2018 (JP) .............................. JP2018-080453

(51) Int. Cl.
| G01L 5/12 | (2006.01) |
| B60B 27/00 | (2006.01) |
| G01L 5/16 | (2020.01) |
| G01L 5/00 | (2006.01) |

(52) U.S. Cl.
CPC ............ *G01L 5/12* (2013.01); *B60B 27/0068* (2013.01); *G01L 5/0019* (2013.01); *G01L 5/16* (2013.01); *B60B 2380/12* (2013.01)

(58) Field of Classification Search
CPC . G01L 5/12; G01L 5/16; G01L 5/0019; B60B 27/0068
See application file for complete search history.

(56) References Cited

U.S. PATENT DOCUMENTS

| 4,748,844 A | * | 6/1988 | Yoshikawa | ............. G01L 5/161 73/146 |
| 5,564,995 A | * | 10/1996 | Roder | ................... F16C 35/073 475/331 |
| 6,658,943 B2 | * | 12/2003 | McDearmon | ......... G01L 5/0019 73/795 |

(Continued)

FOREIGN PATENT DOCUMENTS

| JP | 2003-014563 A | 1/2003 |
| JP | 4126986 B2 | 7/2008 |

(Continued)

*Primary Examiner* — Tran M. Tran
(74) *Attorney, Agent, or Firm* — Sughrue Mion, PLLC

(57) ABSTRACT

An action force detecting unit for a rotary member that detects a force acting on a rotary member such as a rotary shaft and a wheel easily and accurately. The action force detecting unit comprises: a first rotor rotated integrally with a tire; a second rotor rotated relatively to the first rotor; a case fixed to a vehicle body while rotatably supporting the first rotor and the second rotor; a first thrust bearing supporting the first rotor; a second thrust bearing supporting the second rotor; a load translating mechanism transmitting a torque between the first rotor and the second rotor while translating the torque partially into a thrust force; a detector fixed to the case to detect a flexure relating to the thrust force applied to the second thrust bearing; a calculator calculating the force acting on the tire based on the flexure detected by the detector; and a transmitter transmitting a signal in accordance with a torque calculated by the calculator.

17 Claims, 8 Drawing Sheets

(56) References Cited

U.S. PATENT DOCUMENTS

| | | | |
|---|---|---|---|
| 6,915,708 B2* | 7/2005 | Isono | G01L 5/161 73/862 |
| 7,780,358 B2* | 8/2010 | Ozaki | F16C 19/522 384/448 |
| 7,878,713 B2* | 2/2011 | Ozaki | F16C 19/186 384/448 |
| 8,021,052 B2* | 9/2011 | Ozaki | B60B 27/0005 384/448 |
| 8,096,173 B2* | 1/2012 | Isono | G01L 5/16 73/146 |
| 8,167,497 B2* | 5/2012 | Ozaki | B60B 27/00 384/448 |
| 8,307,931 B2* | 11/2012 | Akamatsu | B60T 8/329 180/65.51 |
| 8,346,490 B2* | 1/2013 | Isobe | F16C 19/522 702/42 |
| 8,434,947 B2* | 5/2013 | Isobe | F16C 19/522 384/448 |
| 8,523,446 B2* | 9/2013 | Isobe | B60B 27/0068 384/448 |
| 8,887,581 B2* | 11/2014 | Zaaijer | G01L 1/2231 73/862.49 |
| 8,960,011 B2* | 2/2015 | Nagano | G01L 1/005 73/767 |
| 9,370,967 B2* | 6/2016 | Shimoyama | B60B 27/0078 |
| 9,404,540 B2* | 8/2016 | Takahashi | F16C 41/00 |
| 9,541,128 B2* | 1/2017 | Erskine | F16J 15/3296 |
| 2003/0000316 A1 | 1/2003 | Isono | |
| 2007/0039401 A1* | 2/2007 | Isono | G01L 3/1457 73/862.326 |
| 2009/0097791 A1* | 4/2009 | Ozaki | F16C 19/522 384/448 |
| 2009/0214146 A1* | 8/2009 | Ehinger | G01L 1/2237 384/448 |
| 2014/0245838 A1 | 9/2014 | Nagano et al. | |

FOREIGN PATENT DOCUMENTS

| | | |
|---|---|---|
| JP | 2010-215079 A | 9/2010 |
| JP | 2011-080541 A | 4/2011 |
| JP | 2014-169864 A | 9/2014 |
| JP | 2017-207451 A | 11/2017 |

* cited by examiner

ACTION FORCE DETECTING UNIT FOR ROTARY MEMBER

CROSS REFERENCE TO RELATED APPLICATIONS

The present application claims the benefit of priority to Japanese Patent Application No. 2018-080453 filed on Apr. 19, 2018 with the Japanese Patent Office, the entire contents of which are incorporated herein by reference in its entirety.

BACKGROUND

Field of the Disclosure

Embodiments of the disclosure relate to the art of a detecting device for detecting a load such as a torque or a thrust force applied to a rotary member.

Discussion of the Related Art

JP-A-2017-207451 describes a measuring device that detects a torque and a thrust force acting on a wheel. In order to reduce an axial dimension and a manufacturing cost, and to simplify a structure, a flexible disc is employed as a main body of the measuring device taught by JP-A-2017-207451. The main body is attached to a hub on the axle side, and the wheel is attached to the hub across the main body. In the main body, hub fastening holes and wheel fastening holes are formed alternately at equal intervals on a virtual first concentric circle. A separation hole extending in the radial direction is formed in each clearance between the hub fastening hole and the wheel fastening hole. A flexible portion is formed on a second concentric circle which is diametrically larger than the first concentric circle. A strain gauge is attached to an inner peripheral surface and the outer peripheral surface of the flexible portion respectively to measure torque and thrust force acting on a tire based on electric signals obtained from the strain gauges. According to the teachings of JP-A-2017-207451, an output signal of a strain gauge is transmitted as a radio wave from a transmitter, and the radio wave is received by a receiver installed on a vehicle. Here, a known slip ring device is employed in the measuring device taught by JP-A-2017-207451.

JP-A-2003-14563 describes a detection device which can detect force acting on a tire accurately. The detection device taught by JP-A-2003-14563 is applied to a vehicle comprises a wheel assembly in which a tire is mounted on a wheel, and a hub to which the wheel assembly is attached. Specifically, the detection device taught by JP-A-2003-14563 is arranged between the hub on the axle side and the wheel assembly. The detection device is provided with a detecting member to which a detecting element such as a strain gauge or a piezoelectric element is attached. The detecting member is adapted to transmit a force between the hub and the wheel, and to detect longitudinal force, lateral force, and vertical force acting on the wheel. The detection device taught by JP-A-2003-14563 comprises a motion converter that mechanically converts rotational motion into linear motion parallel with the rotational axis by using a principle of leverage, and transmits the converted linear motion to the detecting member. According to the teachings of JP-A-2003-14563, an electrical signal is transmitted from the detection device to a vehicle body by a wireless method.

JP-A-2014-169864 describes a wheel operating force sensor that is easily mounted on a vehicle, and does not require complex computational processing for output processing. The sensor taught by JP-A-2014-169864 comprises: an attachment fixed to a vehicle body member supported by a suspension device; a hub to which a wheel is fixed and which is rotatably supported about a wheel axis with respect to the attachment; a sensing body having a tube formed substantially concentrically with the wheel axis, one end of the tube being fixed to the attachment, and the other end being connected to the hub, with a hub bearing being interposed between the other end and the hub; and a six-component force detector having a bridge circuit and strain gauges provided on a circumferential surface of the sensing body. The hub bearing has: a radial bearing provided between the sensing body and the hub and receiving a load in a radial direction; and a thrust bearing provided between the sensing body and the hub and receiving a load in a thrust direction, and moreover provided separately from the radial bearing.

In the measuring device described in JP-A-2017-207451, the strain gauge is attached to a flexible portion formed in the main body. The main body is disposed between the hub on the axle side and the wheel to be rotated together with the axle and the wheel. On the other hand, according to the teachings of JP-A-2003-14563, the detecting element such as a strain gauge or a piezoelectric element is arranged in the detection device. The detection device taught by JP-A-2003-14563 is also disposed between the hub on the axle side and the wheel to be rotated together with the axle and the wheel. Thus, in both of the devices taught by JP-A-2017-207451 and JP-A-2003-14563, the sensor element for detecting a load is arranged in the rotary member of the main body or detection device. For this reason, it is not easy to it is not easy to extract an output signal from the sensor element rotating together with the rotary member.

By contrast, in the sensor taught by JP-A-2014-169864, the sensing body having a sensor element is fixed to the vehicle body. According to the teachings of JP-A-2014-169864, therefore, an output signal from the sensor element can be obtained directly without using the wireless communication and the slip ring as described JP-A-2017-207451 and JP-A-2003-14563. As described, in the sensor taught by JP-A-2014-169864, the sensing body having the sensor element serves as a member for transmitting power between the wheel and the hub unit. For this purpose, the sensing body is required to have a sufficient strength and rigidity. Nonetheless, in order to enhance detection accuracy of the sensor element attached to the sensing body, it is necessary to flexibly deform the sensing body thereby increasing an output gain of the sensor element. However, it is not easy to increase both rigidity and flexibility of the sensing body.

Thus, the conventional sensors have to be improved to detect a load acting on a rotary member easily and accurately.

SUMMARY

Aspects of embodiments of the present disclosure have been conceived noting the foregoing technical problems, and it is therefore an object of the present disclosure to provide an action force detecting unit for a rotary member that detects a force acting on a rotary member such as a rotary shaft and a wheel easily and accurately.

According to the exemplary embodiment of the present disclosure, there is provided an action force detecting unit that is arranged between a predetermined rotary member and a predetermined stationary member supporting the rotary member in a rotatable manner to detect a force acting on the rotary member. In order to achieve the above-explained objective, the action force detecting unit is provided with: a first rotor that is connected to the rotary member to be rotated integrally with the rotary member; a second rotor that is arranged coaxially with the first rotor to be opposed to the first rotor while being allowed to rotate relatively to the first rotor; a supporting member that is fixed to the stationary member while supporting the first rotor and the second rotor respectively in a rotatable manner; a first thrust bearing that is interposed between the first rotor and the supporting member to support the first rotor by receiving a thrust force acting on the first rotor in a direction along a rotational center axis; a second thrust bearing that is interposed between the second rotor and the supporting member to support the second rotor by receiving a thrust force acting on the second rotor in the direction along the rotational center axis; a load translating mechanism that is arranged between the first rotor and the second rotor to be rotated integrally with the first rotor and the second rotor, so as to transmit a torque between the first rotor and the second rotor while translating the torque partially into a thrust force transmitted between the first rotor and the second rotor; a detector including a flexure element that is partially fixed to the supporting member, and that is deformed by at least any one of the thrust force acting on the first thrust bearing and the thrust force acting on the second thrust bearing, and a sensor element that is attached to the flexure element to detect a physical amount relating to the thrust force deforming the flexure element; a calculator calculating the force acting on the rotary member based on the physical amount detected by the detector; and a transmitter that is arranged on the supporting member, and that transmits an output signal to the calculator in accordance with the physical amount detected by the detector, or to an external element in accordance with the force calculated by the calculator.

In a non-limiting embodiment, the flexure element may be elastically deformed by the thrust force applied to the second thrust bearing from the second rotor. The sensor element may detect a flexure or displacement of the flexure element being deformed. The second thrust bearing may comprise a shaft washer rotated integrally with the second rotor, and a housing washer contacted to the flexure element. The sensor element may be electrically connected to the calculator and the transmitter. The calculator may calculate a torque acting on the rotary member based on the flexure or displacement detected by the sensor element.

In a non-limiting embodiment, the flexure element may include: a first flexure element that is partially fixed to the supporting member, and that is deformed by the thrust force applied to the first thrust bearing from the first rotor; and a second flexure element that is partially fixed to the supporting member, and that is deformed by the thrust force applied to the second thrust bearing from the second rotor. The sensor element may include: a first sensor element that is attached to the first flexure element to detect a flexure or displacement of the first flexure element being deformed; and a second sensor element that is attached to the second flexure element to detect a flexure or displacement of the second flexure element being deformed. The first thrust bearing may comprise a first shaft washer rotated integrally with the first rotor, and a housing washer contacted to the first flexure element. The second thrust bearing may comprise a second shaft washer rotated integrally with the second rotor, and a second housing washer contacted to the second flexure element. The first sensor element and the second sensor element may be electrically connected respectively to the calculator and the transmitter. The calculator may calculate at least any one of the torque and the thrust force acting on the rotary member based on the flexures or displacements detected by the first sensor element and the second sensor element.

In a non-limiting embodiment, the action force detecting unit may further comprise a load restricting mechanism that defines an upper limit of the thrust force acting on the flexure element.

In a non-limiting embodiment, the action force detecting unit may further comprise: a first load restricting mechanism that defines an upper limit of the thrust force acting on the first flexure element; and a second load restricting mechanism that defines an upper limit of the thrust force acting on the second flexure element.

In a non-limiting embodiment, the action force detecting unit may further comprise a preload mechanism that applies a thrust force preliminary to the flexure element.

In a non-limiting embodiment, the action force detecting unit may further comprise a preload mechanism that applies a thrust force preliminary to the second flexure element.

In a non-limiting embodiment, the first rotor may be connected to a wheel of a vehicle on which a tire is mounted. The supporting member may be fixed to a vehicle body of the vehicle. The calculator may calculate a torque acting on the tire based on the flexure or displacement detected by the sensor element.

In a non-limiting embodiment, the first rotor may be connected to a wheel of a vehicle on which a tire is mounted. The supporting member may be fixed to a vehicle body of the vehicle. The calculator may calculate at least any one of a torque and a lateral force acting on the tire based on the flexures or displacements detected by the first sensor element and the second sensor element.

Thus, in the action force detecting unit according to the exemplary embodiment of the present disclosure, the force applied to the rotary member connected to the first rotor is transmitted to the first thrust bearing and the second thrust bearing in the form of an axial load or thrust force via the load translating mechanism. The detector detects a physical amount relating to at least one of the thrust force applied to the first thrust bearing and the thrust force applied to the second thrust bearing, and the calculator calculates the force acting on the rotary member based on the detected physical amount. In the action force detecting unit, the detector and the transmitter are arranged on the supporting member that is not allowed to rotate. The calculator may be arranged on the supporting member together with the detector. Instead, the calculator may also be arranged outside of the detecting unit. In the case of arranging the calculator on the supporting member together with the detector and the transmitter, an output signal from the calculator is transmitted to an external element. By contrast, in the case of arranging the calculator outside of the detecting unit, an output signal of the detector is transmitted from the transmitter to the calculator, and an output signal from the calculator is transmitted to the external element. According to the exemplary embodiment of the present disclosure, therefore, the output signal from the detector or the calculator may be received accurately without using a wireless communication system and a snap ring. In addition, since the detector is fixed to the stationary member to detect only the thrust force acting in the axial direction, a structure of the action force detecting unit may be simplified. According to the exemplary embodiment of the present disclosure, therefore, the force acting on the rotary member such as a rotary shaft and a wheel may be detected easily and accurately.

In the action force detecting unit according to the exemplary embodiment of the present disclosure, the detector includes the flexure element and the sensor element such as a strain gauge and a piezoelectric element. The flexure element is partially fixed to the supporting member as a stationary member, and deformed by the thrust force applied to the housing washer of the second thrust bearing. That is, the flexure element is a cantilever in which one end thereof is fixed. According to the exemplary embodiment of the present disclosure, therefore, a flexure or displacement of the flexure element deformed elastically may be detected easily and accurately. Such flexure or displacement is caused in accordance with a torque translated into a thrust force by the load translating mechanism. For this reason, the torque acting on the rotary member may be detected easily and accurately by detecting the flexure or displacement of the flexure element.

In the action force detecting unit according to the exemplary embodiment of the present disclosure, the detector includes the first flexure element and the second flexure element, and the sensor element includes the first sensor element and the second flexure element each of which is strain gauge and a piezoelectric element. The first flexure element is partially fixed to the supporting member as a stationary member, and deformed by the thrust force applied to the housing washer of the first thrust bearing. Likewise, the second flexure element is partially fixed to the supporting member as a stationary member, and deformed by the thrust force applied to the housing washer of the second thrust bearing. That is, each of the first flexure element and the second flexure element is a cantilever in which one end thereof is fixed. According to the exemplary embodiment of the present disclosure, therefore, a flexure or displacement of each of the first flexure element and the second flexure element may be detected easily and accurately. Such flexure or displacement is caused in accordance with a torque translated into a thrust force by the load translating mechanism, and torques transmitted to the first thrust bearing and the second thrust bearing via the load translating mechanism. For this reason, the torque acting on the rotary member may be detected easily and accurately by detecting the flexure or displacement of the flexure element.

In the action force detecting unit according to the exemplary embodiment of the present disclosure, the thrust force applied to the flexure element is restricted by the load restricting mechanism. By thus defining the upper limit of the thrust force acting on the flexure element, a designed strength or rigidity of the flexure element may be lowered. According to the exemplary embodiment, therefore, the flexure element is allowed to be deformed easily. For this reason, a detection range of the flexure or displacement by the sensor element may be widened so that the detection accuracy of the torque or the thrust force acting on the rotary member is improved.

Specifically, the thrust force applied to the first flexure element is restricted by the first load restricting mechanism, and the thrust force applied to the second flexure element is restricted by the second load restricting mechanism. By thus defining the upper limit of the thrust forces acting on the first and the second flexure elements, a designed strength or rigidity of each of the flexure elements may be lowered respectively. According to the exemplary embodiment, therefore, both of the first flexure element and the second flexure element are allowed to be deformed easily. For this reason, a detection range of the flexure or displacement by the sensor element may be widened so that the detection accuracy of the torque or the thrust force acting on the rotary member is improved.

In the action force detecting unit according to the exemplary embodiment of the present disclosure, a preload is applied to the flexure element by the preload mechanism. As described, the thrust force is applied to the flexure element through the second rotor and the second thrust bearing. That is, the preload may be applied to the flexure element in addition to the thrust force applied to the flexure element from the second thrust bearing. By thus applying the preload to the flexure element, an end play of the second thrust bearing in the axial direction may be packed. For this reason, the flexure or displacement of the flexure element caused by the thrust force applied from the second thrust bearing can be detected accurately thereby detecting the torque acting on the rotary member accurately.

Specifically, a preload is applied to the second flexure element by the preload mechanism. As described, the thrust force is applied to the second flexure element through the second rotor and the second thrust bearing. That is, the preload may be applied to the second flexure element in addition to the thrust force applied to the second flexure element from the second thrust bearing. By thus applying the preload to the second flexure element, the end play of the second thrust bearing in the axial direction may be packed. For this reason, the flexure or displacement of the second flexure element caused by the thrust force applied from the second thrust bearing can be detected accurately thereby detecting the torque acting on the rotary member accurately.

The action force detecting unit according to the exemplary embodiment of the present disclosure may be arranged between the vehicle body and the wheel of the vehicle. Specifically, the first rotor is connected to the wheel of the vehicle on which the tire is mounted, and the supporting member is fixed to the vehicle body as a stationary member. In this case, the detector detects a flexure or displacement of the flexure element deformed by the thrust force applied from the second thrust bearing, and the calculator calculates a torque acting on the tire based on the detected flexure or displacement. According to the exemplary embodiment of the present disclosure, therefore, the torque acting on the tire may be detected accurately.

In the case of arranging the action force detecting unit between the vehicle body and the wheel, the detector detects a flexure or displacement of the first flexure element deformed by the thrust force applied from the first thrust bearing, and a flexure or displacement of the first flexure element deformed by the thrust force applied from the first thrust bearing. In this case, the calculator calculates at least any one of a torque and lateral force acting on the tire based on the detected flexures or displacements of the first flexure element and the second flexure element. Specifically, the lateral force is a thrust force acting on the tire, that is, a load acting on the tire in the axial direction. According to the exemplary embodiment of the present disclosure, therefore, the torque and lateral force acting on the tire may be detected accurately.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

A preferred embodiment of the present disclosure will now be explained with reference to the accompanying drawings.

The detecting unit according to the exemplary embodiment of the present disclosure is disposed between a predetermined rotary member such as a rotary shaft of machinery and a tire of a vehicle and a predetermined stationary member supporting the rotary member in a rotatable manner. For example, the detecting unit may be arranged between a rotary shaft of a machine tool and a base member in which a bearing supporting the rotary shaft is arranged, so as to detect a torque acting on the rotary shaft. Otherwise, the detecting unit may also be arranged between a wheel and a vehicle body so as to detect a torque and a lateral force acting on the wheel.

Figure 1:
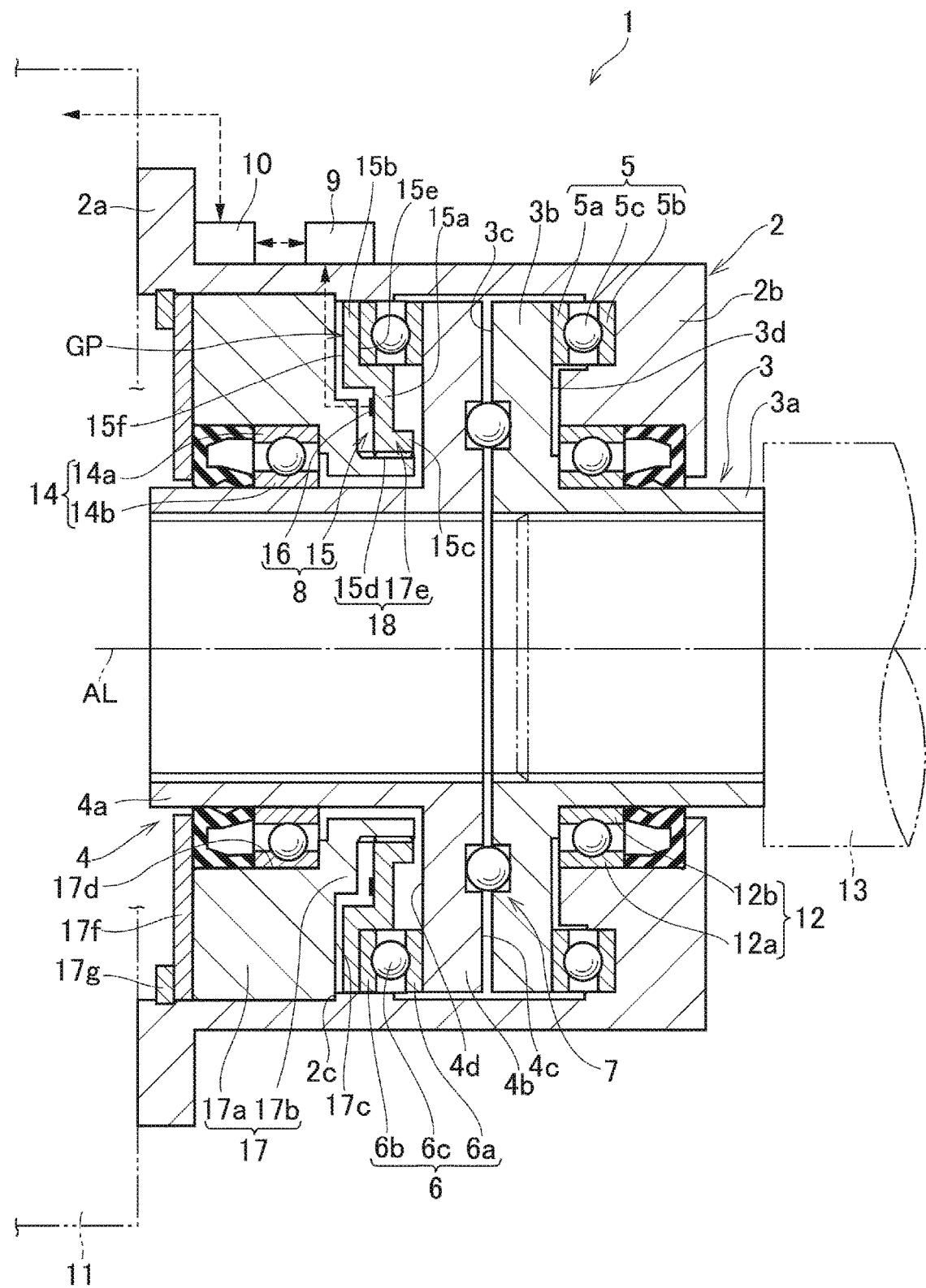
FIG. 1 is a cross-sectional view showing an example of a structure of the action force detecting unit for a rotary member according to the present disclosure in which the sensor element is arranged in the second rotor side.

One example of a structure of the action force detecting unit for a rotary member 1 according to the exemplary embodiment is shown in FIG. 1. The action force detecting unit 1 comprises a case 2, a first rotor 3, a second rotor 4, a first thrust bearing 5, a second thrust bearing 6, a load translating mechanism 7, a detector 8, a calculator 9, and a transmitter 10.

For example, the case 2 is a cylindrical case, and main components of the action force detecting unit 1 such as the first rotor 3 and the second rotor 4 are held in a hollow space of the case 2. In the exemplary embodiment, the case 2 serves as a supporting member, and is fixed to a predetermined stationary member. According to the example shown in FIG. 1, a flange 2a is formed on one end of the case 2, and the flange 2a is fixed to a stationary member 11 of a predetermined machinery thereby preventing a rotation of the case 2. The other end of the case 2 is closed by a cover 2b as a plate portion, and a through hole is formed at a center of the cover 2b in accordance with a configuration of a leading end of the first rotor 3.

The first rotor 3 comprises a cylindrical portion 3a and an opposing flange 3b, and is connected to a predetermined rotary member to be rotated integrally with the rotary member. The cylindrical portion 3a is supported by the cover 2b of the case 2 through a radial bearing 12. Specifically, an outer race 12a of the radial bearing 12 is pressed into the through hole of the cover 2b of the case 2, and the cylindrical portion 3a of the first rotor 3 is inserted into an inner race 12b of the radial bearing 12. Thus, the first rotor 3 is supported by the case 2 in a rotatable manner. The opposing flange 3b is formed on one end of the cylindrical portion 3a, and an end face 3c of the opposing flange 3b is opposed to an after-mentioned opposing flange 4b of a second rotor 4. In the example shown in FIG. 1, the opposing flange 3b, the opposing flange 4b, and a cam ball 7c serve as the load translating mechanism 7. In the first rotor 3, a spline or serration is formed on an inner circumferential face of the other end (i.e., a leading end) of the cylindrical portion 3a so that the cylindrical portion 3a is rotated integrally with a rotary shaft (or body) 13 of the predetermined machinery.

The second rotor 4 is disposed coaxially with the first rotor 3 on a rotational axis AL while being opposed to the first rotor 3. The second rotor 4 comprises a cylindrical portion 4a and the opposing flange 4b. The cylindrical portion 4a is supported by the case 2 through a radial bearing 14 and a main body 17a of a load restricting mechanism 17. Thus, the second rotor 4 is also supported by the case 2 in a rotatable manner together with the first rotor 3. In the case 2, the first rotor 3 and the second rotor 4 are supported separately so that the first rotor 3 and the second rotor 4 are allowed to rotate relatively to each other. The opposing flange 4b is formed on one end of the cylindrical portion 4a, and an end face 4c of the opposing flange 4b is opposed to the opposing flange 3b of the first rotor 3. As described, the opposing flange 4b, the opposing flange 3b, and the cam ball 7c serve as the load translating mechanism 7.

The first thrust bearing 5 is disposed between the first rotor 3 and the case 2. Specifically, the first thrust bearing 5 is disposed between a back face 3d of the opposing flange 3b and the cover 2b of the case 2. The first thrust bearing 5 comprises: a shaft washer 5a rotated integrally with the first rotor 3; a housing washer 5b contacted fixedly to the cover 2b; and a rolling member 5c held by a holder (not shown) between the shaft washer 5a and the housing washer 5b. Thus, the first thrust bearing 5 supports the first rotor 3 in a rotatable manner while receiving a thrust force or a reaction force applied to the first rotor 3 in the axial direction AL.

The second thrust bearing 6 is disposed between the second rotor 4 and the case 2. Specifically, the second thrust bearing 6 is disposed between a back face 4d of the opposing flange 4b of the second rotor 4 and a flexure element 15 of the detector 8. The second thrust bearing 6 comprises: a shaft washer 6a rotated integrally with the second rotor 4; a housing washer 6b contacted fixedly to the flexure element 15 of the detector 8; and a rolling member 6c held by a holder (not shown) between the shaft washer 6a and the housing washer 6b. Thus, the second thrust bearing 6 supports the second rotor 4 in a rotatable manner while receiving a thrust force or a reaction force applied to the second rotor 4 in the axial direction AL.

The load translating mechanism 7 is arranged between the first rotor 3 and the second rotor 4 to be rotated integrally with the first rotor 3 and the second rotor 4. That is, the load translating mechanism 7 is adapted to transmit torque between the first rotor 3 and the second rotor 4, and to translate the torque being transmitted between the first rotor 3 and the second rotor 4 partially into thrust force in the axial direction AL. In other words, the load translating mechanism 7 translates a rotary motion into a linear motion. To this end, for example, a screw mechanism, a wedge mechanism, a cam mechanism etc. may be employed as the load translating mechanism 7. In the example shown in FIG. 1, a torque cam mechanism operated on the principles of the wedge mechanism and the cam mechanism is employed as the load translating mechanism 7.

Figure 2:
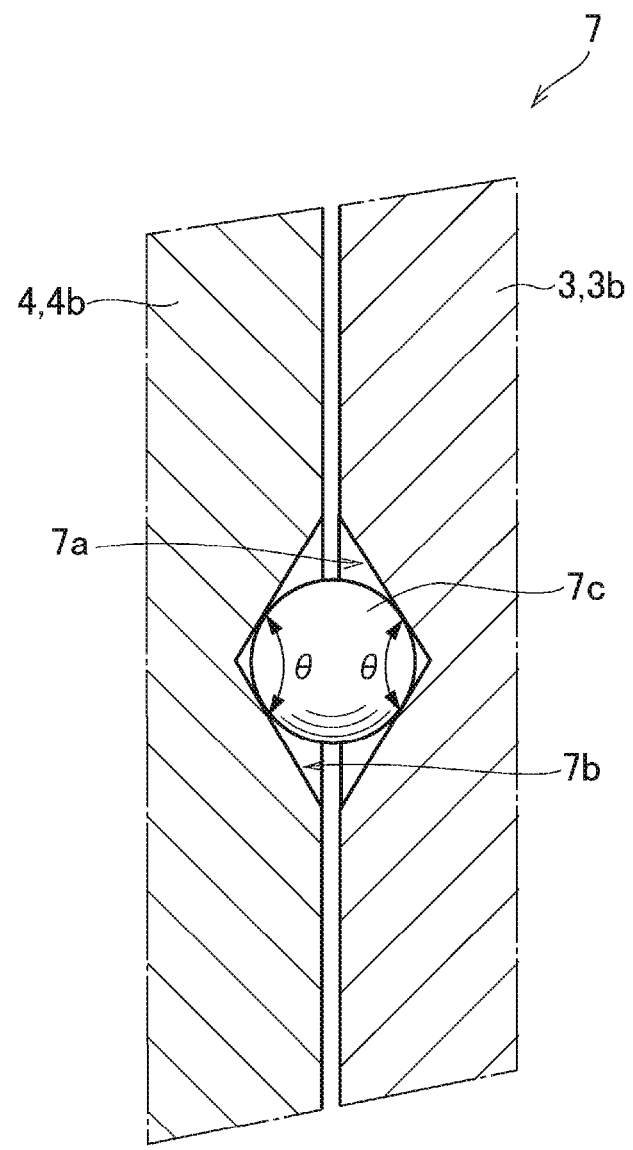
FIG. 2 is an enlarged cross-sectional view showing a cross-section of the load translating mechanism in an enlarged scale.

As illustrated in FIG. 2, the load translating mechanism 7 comprises a first cam face 7a formed on the first rotor 3, a second cam face 7b formed on the second rotor 4, and a cam ball 7c. Specifically, the first cam face 7a is formed on the end face 3c of the opposing flange 3b of the first rotor 3 at a portion opposed to the second cam face 7b, and the second cam face 7b is formed on the end face 4c of the opposing flange 4b of the second rotor 4 at a portion opposed to the first cam face 7a. As illustrated in FIG. 2, each of the first cam face 7a and the second cam face 7b individually formed of two inclined faces. In other words, each of the first cam face 7a and the second cam face 7b has a V-shaped cross-section in the radial direction in which a cam angle between the inclined faces is θ. The cam ball 7c is held between the first cam face 7a and the second cam face 7b in a rotatable manner. For example, a metallic solid body such as a steel ball may be used as the cam ball 7c.

Although two load translating mechanisms 7 are illustrated in the cross-section shown in FIG. 1, four or more load translating mechanisms 7 may be arranged in the action force detecting unit 1. In the exemplary embodiment, specifically, three or more load translating mechanisms 7 are arranged at even intervals in the circumferential direction of the opposing flange 3b of the first rotor 3 or the opposing flange 4b of the second rotor 4.

Thus, the load translating mechanism 7 transmits torque between the first rotor 3 and the second rotor 4 while translating the torque into a thrust force. In other words, the load translating mechanism 7 establishes a thrust force according to a torque difference between the first rotor 3 and the second rotor 4, and transmits the established thrust force between the first rotor 3 and the second rotor 4. In the example shown in FIG. 1, the load translating mechanism 7 transmits the thrust force from the first rotor 3 to the second rotor 4.

For example, a fundamental structure and a principle of the torque cam mechanism employed as the load translating mechanism 7 are described in Japanese patent No. 4126986, JP-A-2010-215079, JP-A-2011-80541. Therefore, a detailed explanation about the load translating mechanism 7 will be omitted.

The detector 8 comprises the flexure element 15 and a sensor element 16, and the detector 8 is arranged on a supporting member of the exemplary embodiment. In the example shown in FIG. 1, the detector 8 is attached to the case 2 fixed to the stationary member 11 so as to detect a physical amount of at least any one of a thrust force acting on the first thrust bearing 5 and a thrust force acting on the second thrust bearing 6. In the example shown in FIG. 1, specifically, the detector 8 is adapted to detect a physical amount relating to a thrust force applied to the second thrust bearing 6 from the second rotor 4.

The flexure element 15 is partially fixed to the case 2, and flexibly deformed by receiving the thrust force applied to the second thrust bearing 6 from the second rotor 4. In the example shown in FIG. 1, the flexure element 15 comprises a beam portion 15a and a contact portion 15b.

The beam portion 15a is an annular plate portion, and a boss 15c is formed on a central portion of the beam portion 15a. The boss 15c is fixed to a joining section 17b of the load restricting mechanism 17 through a thread. To this end, a thread groove 15d is formed on an inner circumferential face of the boss 15c, and the thread groove 15d is engaged with a thread ridge 17e formed on the joining section 17b of the load restricting mechanism 17. The main body 17a of the load restricting mechanism 17 is fixed to the case 2. The beam portion 15a is made of material having a predetermined stiffness property such that the flexure element 15 is deformed within an elastic limit by the thrust force applied to the contact portion 15b.

The contact portion 15b is formed on radially outer side of the beam portion 15a, and the contact portion 15b comprises a contact face 15e that is brought into close contact to the housing washer 6b of the second thrust bearing 6. In the contact portion 15b, the contact face 15e is thus contacted closely to the housing washer 6b, but a back face 15f of the contact face 15e is not contacted to any member so that a clearance GP is maintained between the back face 15f and an opposing face 17c of the load restricting mechanism 17. An outer circumference of the contact portion 15b is splined to an inner circumference of the case 2. Therefore, a rotation of the flexure element 15 around the rotational axis AL is restricted, but the contact portion 15b is allowed to be moved along the rotational axis AL by the thrust force applied from the second thrust bearing 6 in the direction from the first rotor 3 toward the second rotor 4.

The beam portion 15a and the contact portion 15b are formed integrally, and a portion of the flexure element 15, that is, the boss 15c is fixed to the case 2. That is, the flexure element 15 is a cantilever in which one end of the contact portion 15b side (i.e., an end portion of the case 2 side in the vertical direction in FIG. 1) is a free end, and the other end of the beam portion 15a side (i.e., an end portion of the rotational axis AL side in the vertical direction in FIG. 1) is a fixed end. In the flexure element 15, when the contact portion 15b receives the thrust force applied to the second thrust bearing 6 from the second rotor 4, the beam portion 15a is subjected to a bending moment to be deformed elastically.

In order to detect a flexure or displacement of the flexure element 15 deformed by the thrust force applied to the second thrust bearing 6 as a physical amount relating to the thrust force acting on the second thrust bearing 6, the sensor element 16 is attached to the flexure element 15. Specifically, the sensor element 16 is attached to the beam portion 15a of the flexure element 15 to detect a flexure or displacement of the beam portion 15a deformed by the bending moment. In the example shown in FIG. 1, a strain gauge is employed as the sensor element 16. Specifically, the strain gauge outputs a voltage in proportion to a change amount of a resistance value which is changed in accordance with a flexure or distortion of e.g., the beam portion 15a. Instead, a piezoelectric element or a pressure sensor may also be used as the sensor element 16.

Thus, the sensor element 16 transmits a detection value of a flexure or displacement of the flexure element 15 deformed by the thrust force in the form of an electric signal of e.g., an output voltage. The output signal of the sensor element 16 is transmitted to the calculator 9, and further transmitted externally from the transmitter 10 in the form of an output signal calculated by the calculator 9. Alternatively, the output signal of the sensor element 16 may also be transmitted directly to the transmitter 10, and further transmitted to the calculator 9 arranged outside. In this case, an output signal calculated by the calculator 9 is transmitted externally from the calculator 9.

As described, the main components of the action force detecting unit 1 comprises the case 2, the first rotor 3, the second rotor 4, the first thrust bearing 5, the second thrust bearing 6, the load translating mechanism 7, the detector 8 and so on. In addition, the action force detecting unit 1 further comprises the load restricting mechanism 17, and a preload mechanism 18.

The load restricting mechanism 17 serves as a stopper that restricts a thrust force acting on the flexure element 15 of the detector 8. In other words, the load restricting mechanism 17 defines an upper limit of the thrust force acting on the flexure element 15 of the detector 8. In the example shown in FIG. 1, the load restricting mechanism 17 is held in the hollow space of the case 2 on an opposite side of the second thrust bearing 6 in the axial direction AL across the flexure element 15. As described, the load restricting mechanism 17 comprises the main body 17a, and the joining section 17b.

The main body 17a is a thick annular plate, and fixed to the case 2 in such a manner as not to move in the axial direction AL. Specifically, the main body 17a comprises the opposing face 17c opposed to the back face 15f of the contact portion 15b of the flexure element 15, and an installation face 17d on which the radial bearing 14 is installed.

The opposing face 17c is formed on an outer circumferential portion of one end of the main body 17a (i.e., a right end in FIG. 1). An outer circumferential portion of the opposing face 17c is brought into abutment to a stopper face 2c formed on the inner circumferential face of the case 2 when fixing the main body 17a to the case 2, so that the clearance GP is maintained between the back face 15f of the flexure element 15 and the opposing face 17c. A width of the clearance GP is set in such a manner that the flexure element 15 will not be deformed more than the elastic limit by the thrust force applied to the flexure element 15 from the second rotor 4 and the second thrust bearing 6. Therefore, even if the flexure element 15 is displaced in the axial direction AL by the thrust force while being deformed to a maximum extent until the back face 15f of the flexure element 15 comes into contact to the opposing face 17c, such deformation of the flexure element 15 is still within the elastic limit and hence the flexure element 15 will not be deformed plastically.

The installation face 17d is formed on an inner circumferential face of the main body 17a, and the radial bearing 14 is fixed to the installation face 17d to support the second rotor 4. Specifically, an outer race 14a of the radial bearing 14 is pressed into the installation face 17d, and the cylindrical portion 4a of the second rotor 4 is pressed into an inner race 14b of the radial bearing 14.

The joining section 17b as a cylindrical portion is formed on an inner circumferential portion of one end of the main body 17a to protrude toward the opposing flange 4b of the second rotor 4. As described, the thread ridge 17e is formed on an outer circumferential face of a leading end portion of the joining section 17b, and the thread ridge 17e is engaged with the thread groove 15d formed on the inner circumferential face of the boss 15c of the flexure element 15. Thus, the flexure element 15 is fixed to the joining section 17b by engaging the thread groove 15d of the flexure element 15 with the thread ridge 17e of the joining section 17b. That is, the flexure element 15 is fixed to the case 2 at the boss 15c as a part of the beam portion 15a through the joining section 17b of the load restricting mechanism 17.

A movement of the other end of the main body 17a of the load restricting mechanism 17 in the axial direction AL is restricted by a cover plate 17f and a snap ring 17g. Specifically, the cover plate 17f is a disc member whose outer circumference is substantially congruent with the inner circumference of the case 2, and the cover plate 17f is attached to the case 2 while being contacted to the other end of the main body 17a of the load restricting mechanism 17. A leading end of the second rotor 4 is inserted into a center hole of the cover plate 17f, and an outer circumferential portion of the cover plate 17f is retained by the snap ring 17g from an axially outer side. Thus, an opening end of the case 2 is closed by the cover plate 17f, and the load restricting mechanism 17 is retained in the case 2 by the snap ring 17g.

The preload mechanism 18 is adapted to apply a preload as a thrust force to the flexure element 15, in addition to the thrust force applied to the flexure element 15 from the second rotor 4 through the second thrust bearing 6. The preload mechanism 18 comprises the boss 15c of the flexure element 15, and the joining section 17b of the load restricting mechanism 17. Specifically, the thread groove 15d formed on the boss 15c and the thread ridge 17e formed on the joining section 17b serve as the preload mechanism 18. That is, the preload mechanism 18 is a feed screw mechanism.

In the action force detecting unit 1, therefore, a fixing position of the flexure element 15 to the joining section 17b may be adjusted in the axial direction AL by rotating the joining section 17b on which the thread ridge 17e is formed and the main body 17a (i.e., the load restricting mechanism 17) around the rotational axis AL. That is, the thrust force (or the preload) may be applied to the flexure element 15 in the axial direction AL by moving the fixing position of the flexure element 15 to the joining section 17b toward the opposing flange 4b of the second rotor 4. In other words, the thrust force applied to the flexure element 15 in the axial direction AL may be increased by moving the fixing position of the flexure element 15 to the joining section 17b toward the opposing flange 4b of the second rotor 4. By contrast, the thrust force applied to the flexure element 15 in the axial direction AL may be reduced by moving the fixing position of the flexure element 15 to the joining section 17b toward the load restricting mechanism 17. Thus, a magnitude of the thrust force applied as a preload to the flexure element 15 may be adjusted by the preload mechanism 18.

The thrust force thus applied as a preload to the flexure element 15 in the axial direction AL by the preload mechanism 18 may be further applied to the second thrust bearing 6 via the contact portion 15b of the flexure element 15. That is, a pushing force may be applied to the second thrust bearing 6 in a direction to push the second thrust bearing 6 toward the opposing flange 4b of the second rotor 4. Consequently, an end play of the second thrust bearing 6 in the axial direction AL may be packed. In addition, an initial value or origin point for executing a calculation by the calculator 9 based on an output signal from the detector 8 may be adjusted by adjusting the thrust force applied as a preload to the flexure element 15 by the preload mechanism 18.

The calculator 9 is configured having a microcomputer as its main constituent, and the output signal from the detector 8 is transmitted to the calculator 9. The calculator 9 performs calculation using incident signals and pre-stored data and formulas, and transmits a calculation result in the form of output signal in accordance with a force acting on a rotary member. Specifically, the calculator 9 calculates a force acting on a rotary member connected to the first rotor 3, on the basis of a physical amount relating to at least any one of the thrust force acting on the first thrust bearing 5 and the thrust force acting on the second thrust bearing 6 detected by the detector 8. In the example shown in FIG. 1, the calculator 9 is configured to calculate a torque acting on the rotary shaft 13 based on an output signal from the sensor element 16 to which detection result is transmitted from the detector 8, in other words, based on the output voltage of the strain gauge. The calculation result is transmitted from the calculator 9 in the form of an output signal (e.g., an electric signal of voltage).

Figure 3:
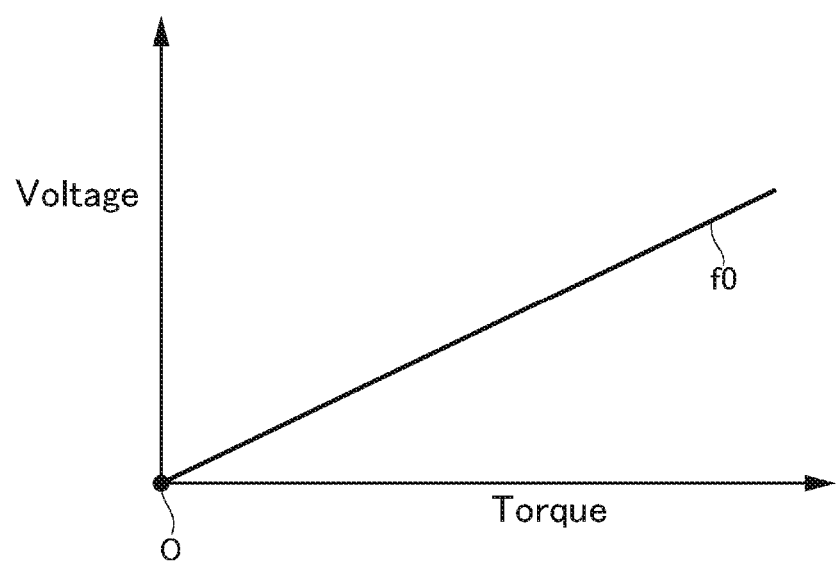
FIG. 3 shows one example of a map for calculating a torque of a rotary shaft by the calculator.

For example, a calculation map determining a torque of the rotary shaft 13 in accordance with the output voltage of the strain gauge shown in FIG. 3 is installed in the calculator 9. In other words, FIG. 3 shows a formula (or a first-degree equation) represented by a line f0. Thus, the calculator 9 calculates a torque acting on the rotary shaft 13 with reference to the map shown in FIG. 3 or using the formula shown in FIG. 3.

As described, in the action force detecting unit 1, an initial value or origin point for executing a calculation by the calculator 9 may be adjusted by adjusting the thrust force applied to the flexure element 15 of the detector 8 by the preload mechanism 18. For example, it is possible to set the initial value of the output signal from the detector 8 (or the output voltage of the strain gauge) to the origin point "0" shown in FIG. 3. According to the exemplary embodiment, therefore, the force acting on the rotary member (e.g., the torque of the rotary shaft 13) may be detected accurately.

The transmitter 10 is installed on the supporting member of the exemplary embodiment. The transmitter 10 transmits an output signal to the calculator 9 in accordance with a physical amount relating to the thrust force detected by the detector 8. Otherwise, the transmitter 10 transmits an output signal to an external element in accordance with the force acting on the rotary member calculated by the calculator 9. In the example shown in FIG. 1, the transmitter 10 is installed on the case 2 together with the detector 8 and the calculator 9, and externally transmits an output signal in accordance with the torque of the rotary shaft 13 calculated by the calculator 9. Specifically, the transmitter 10 is a portion at which an output terminal or an end portion of an output cable or a lead wire is fixed to the case 2. For example, the transmitter 10 may be connected to a control device (not shown) of the rotary shaft 13 arranged outside of the action force detecting unit 1 through a cable or lead wire so as to transmit the output signal from the calculator 9. The calculator 9 is connected to the detector 8 through a cable or lead wire so as to receive the output signal transmitted from the detector 8, and also to the transmitter 10 through a cable or lead wire so as to transmit the output signal from the calculator 9 to the transmitter 10.

In the case of wirelessly receiving an output signal from the sensor element as taught by JP-A-2017-207451 and JP-A-2003-14563, the signal is transmitted through a radio wave or infrared ray. In this case, therefore, the signal may be disturbed by noise and it is required to prepare a countermeasure against noise. In addition, it is also required to secure a power source to activate a transmitter and a receiver. Alternatively, it is also possible to use a snap ring instead of the wireless communication system. In this case, however, an electrode will be worn away inevitably thereby causing a frictional loss. On the other hand, according to the exemplary embodiment, output signals from the detector 8 and the calculator 9 may be transmitted to the external element easily and certainly without using a wireless communication system and a snap ring.

As described, the six-component force detector is employed in the wheel operating force sensor described in JP-A-2014-169864. For this reason, the wheel operating force sensor taught by JP-A-2014-169864 is relatively expensive. In addition, according to the teachings of JP-A-2014-169864, a relative displacement is measured based on a flexure of the sensing body in which one end is fixed. Therefore, a detecting performance of the wheel operating force sensor is restricted by a characteristics of the strain gauge. That is, it is difficult to enhance a detection accuracy of the wheel operating force sensor. As also described, the sensing body serves as a rigid member for transmitting power between the wheel and the hub unit. To this end, it is necessary to enhance a strength or rigidity of the sensing body to be greater than a predetermined value. By contrast, in the action force detecting unit 1 according to the exemplary embodiment, the flexure element 15 is a flexible cantilevered member which does not transmit power. That is, the flexure element 15 may be made of material whose rigidity is relatively low, and deformed significantly within the elastic limit. In addition, since the load restricting mechanism 17 is arranged in the action force detecting unit 1 according to the exemplary embodiment, a designed strength or rigidity of the flexure element 15 may be lowered. According to the exemplary embodiment, therefore, the flexure element 15 is allowed to be deformed easily. For this reason, a detection range of the flexure or displacement by the sensor element 16 may be widened so that the detection accuracy of the torque or the thrust force acting on the rotary shaft 13 is improved.

Figure 4:
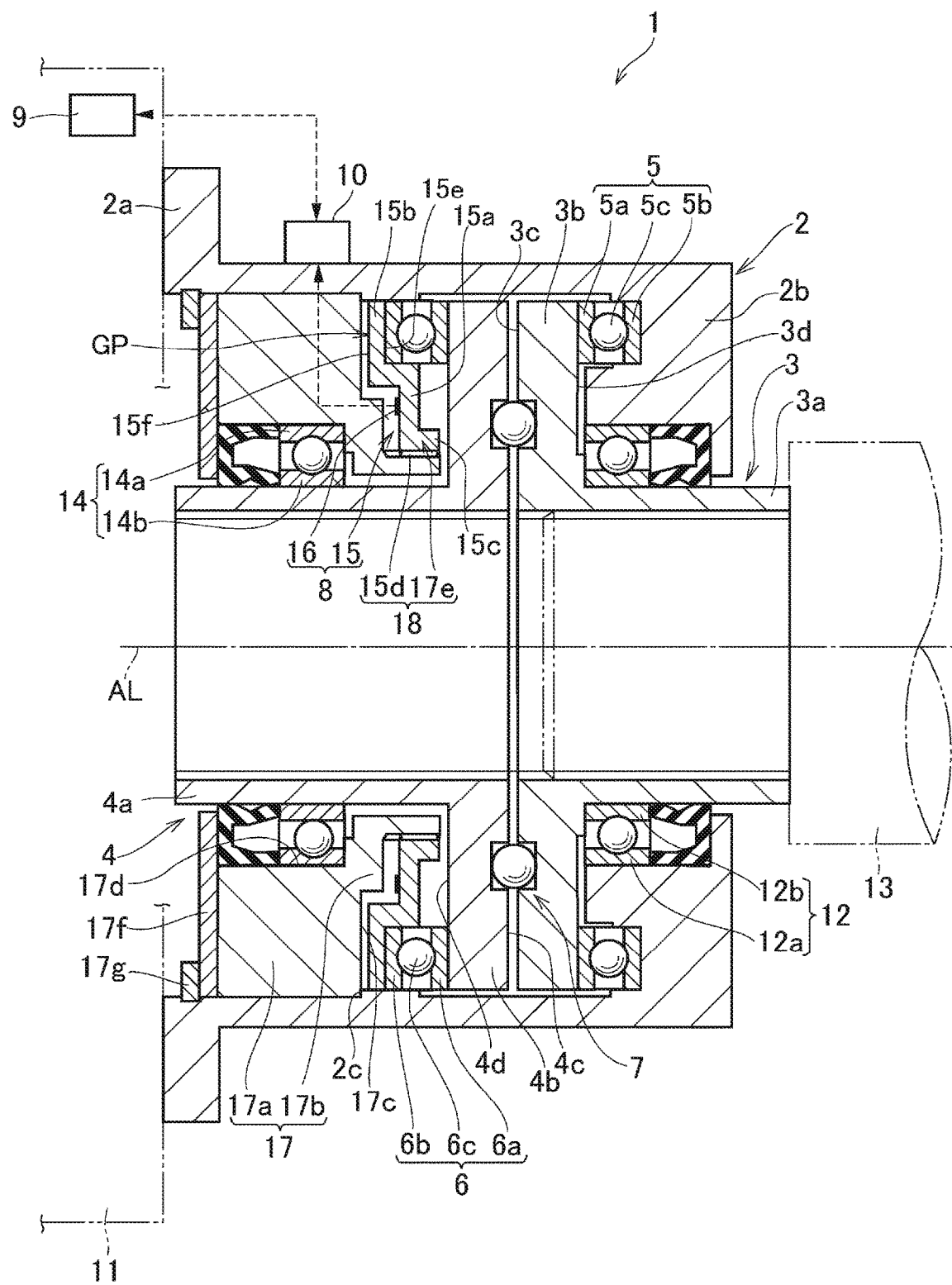
FIG. 4 is a cross-sectional view showing an example of a structure of the action force detecting unit according to the present disclosure in which the calculator is arranged outside of the detecting unit.

FIG. 4 shows a modification example of the action force detecting unit 1 shown in FIG. 1 in which the calculator 9 is arranged outside of the action force detecting unit 1. For example, the calculator 9 may be arranged in the control device (not shown) of the rotary shaft 13 arranged outside of the action force detecting unit 1. Alternatively, a calculator of the control device of the rotary shaft 13 may be employed as the calculator 9. The detector 8 is electrically connected to the transmitter 10 through a cable or a lead wire so that an output signal transmitted from the detector 8 is sent to the transmitter 10. Likewise, the transmitter 10 is also electrically connected to the calculator 9 through a cable or a lead wire so that an output signal transmitted from the transmitter 10 is sent to the calculator 9.

Figure 5:
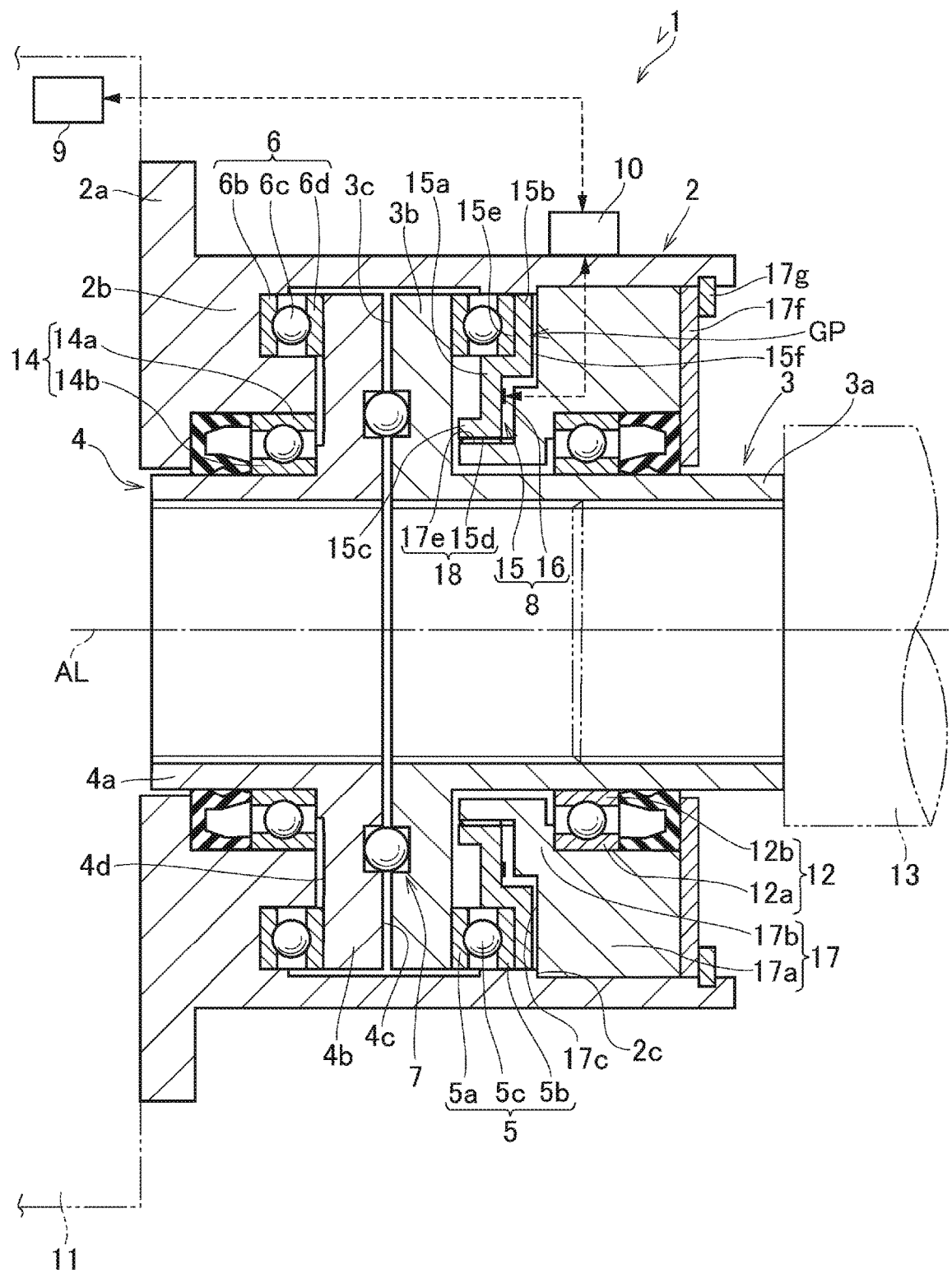
FIG. 5 is a cross-sectional view showing an example of a structure of the action force detecting unit according to the present disclosure in which the sensor element is arranged in the first rotor side.
Figure 6:
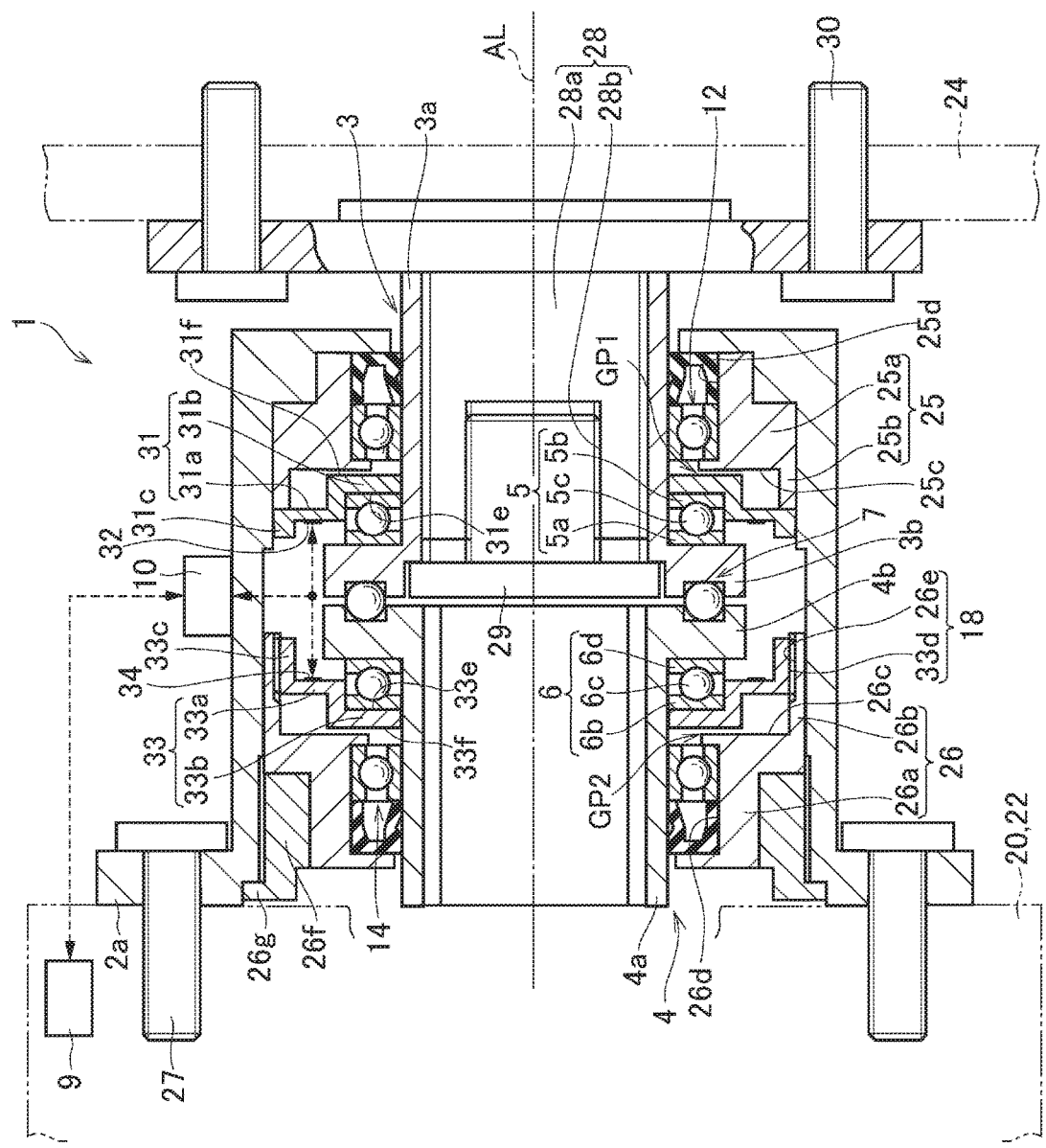
FIG. 6 is a cross-sectional view showing an example of a structure of the action force detecting unit according to the present disclosure in which the first sensor element is arranged in the first rotor side, and the second sensor element is arranged in the second rotor side.

Another examples of the action force detecting unit 1 are shown in FIGS. 5 and 6. In the examples shown in FIGS. 5 and 6, common reference numerals are assigned to the elements in common with those of the example shown in FIG. 1.

In the action force detecting unit 1 shown in FIG. 5, the detector 8 is arranged on radially outer side of the first rotor 3. Specifically, in the action force detecting unit 1 shown in FIG. 5, the detector 8 is arranged on the side of the first rotor 3 and the first thrust bearing 5 in the axial direction AL. As the example shown in FIG. 1, the first rotor 3 is connected to the rotary shaft 13 to be rotated integrally therewith.

In the action force detecting unit 1 shown in FIG. 5, therefore, a reaction force against a thrust force translated from a torque by the load translating mechanism 7 between the first rotor 3 and the second rotor 4 is detected by the detector 8 thus arranged in the side of the first rotor 3. Then, a torque acting on the rotary shaft 13 is detected based on a flexure or distortion resulting from deformation of the flexure element 15 of the detector 8. Thus, in the example shown in FIG. 5, a physical amount relating to the reaction force against the thrust force is detected by the detector 8 arranged on the first rotor 3 side, and it is also possible to detect the torque acting on the rotary shaft 13 easily and accurately. Here, in the example shown in FIG. 5, the calculator 9 is arranged outside of the action force detecting unit 1.

Figure 7:
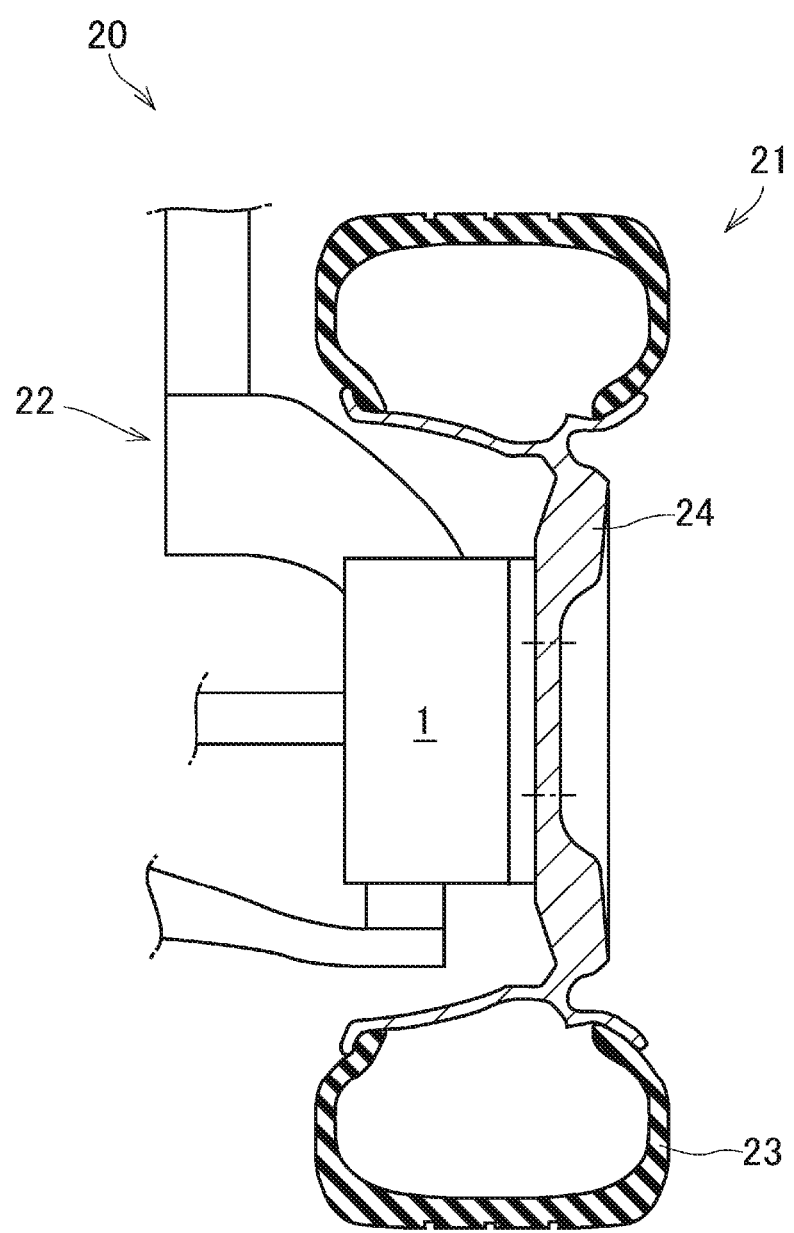
FIG. 7 is schematic illustration showing an example in which the action force detecting unit according to the present disclosure is arranged between the vehicle body and the tire.

As shown in FIG. 7, the action force detecting unit 1 shown in FIG. 6 is arranged between a wheel 21 of a vehicle 20 and a vehicle body (e.g., a suspension of the vehicle 20) 22 to detect a force acting on the wheel 21. The wheel 21 comprises a tire 23 and a wheel rim 24 on which the tire 23 is mounted. That is, the action force detecting unit 1 shown in FIGS. 6 and 7 is adapted to detect a torque and a lateral force acting on the tire 23 of the vehicle 20. The action force detecting unit 1 shown in FIG. 6 comprises the case 2, the first rotor 3, the second rotor 4, the first thrust bearing 5, the second thrust bearing 6, the load translating mechanism 7, the detector 8, the calculator 9, the transmitter 10, the preload mechanism 18, a first load restricting mechanism 25, and a second load restricting mechanism 26. In the action force detecting unit 1 shown in FIG. 6, the calculator 9 is also arranged outside of the action force detecting unit 1. Here, a brake device and the suspension etc. are omitted in FIG. 7.

In the action force detecting unit 1 shown in FIG. 6, the flange 2a is formed on one end of the case 2. A plurality of bolt holes (not shown) are formed on the flange 2a, and the flange 2a is fixed to the vehicle body 22 of the vehicle 20 by bolts 27. Thus, the case 2 is fixed to the vehicle body (i.e., a stationary member) 22 in such a manner as not to rotate.

The first rotor 3 is fixed to the wheel rim 24 of the wheel 21 to be rotated integrally with the wheel 21. Specifically, a flange 28 is joined to one end of the first rotor 3. For example, a serration is formed individually on the inner circumferential face of the cylindrical portion 3a and an outer circumferential face of a boss 28a of the flange 28, and the boss 28a of the flange 28 is pressed into the cylindrical portion 3a of the first rotor 3. A bolt hole 28b is formed on a leading end of the boss 28a, and a bolt 29 is screwed into the bolt hole 28b from the other end side of the first rotor 3 so that the first rotor 3 is joined to the flange 28. Thus, the flange 28 is retained in the first rotor 3 by screwing the bolt 29 into the bolt hole 28b.

A plurality of bolts 30 are screwed into bolt holes of the flange 28 and the wheel rim 24 to fix the flange 28 to the wheel rim 24 so that the first rotor 3 is rotated integrally with the wheel 21. The second rotor 4 is joined to a driveshaft (not shown) of the vehicle 20 to be rotated integrally therewith.

In order to detect physical amounts relating to a thrust force applied to the first thrust bearing 5 and to a thrust force applied to the second thrust bearing 6, in the action force detecting unit 1 shown in FIG. 6, the detector 8 is arranged respectively in the first rotor 3 side and the second rotor 4 side.

In the action force detecting unit 1 shown in FIG. 6, the detector 8 is arranged in the case 2 fixed to the vehicle body 22. The detector 8 comprises a first flexure element 31 arranged in the first rotor 3 side, a first sensor element 32, a second flexure element 33 arranged in the second rotor 4 side, a second sensor element 34. Thus, the detector 8 detects a physical amount relating to a thrust force applied to the first thrust bearing 5 from the first rotor 3, and a physical amount relating to a thrust force applied to the second thrust bearing 6 from the second rotor 4.

The first flexure element 31 is fixed partially to the case 2, and elastically deformed by the thrust force (or a reaction force against the thrust force) applied to the first thrust bearing 5 from the first rotor 3. In the example shown in FIG. 6, the first flexure element 31 comprises a beam portion 31a and a contact portion 31b.

The beam portion 31a is an annular plate portion, and a boss 31c is formed on an outer circumferential portion of the beam portion 31a. The boss 31c is fixed to the inner circumferential face of the case 2 through a thread or by a press fit method. Thus, the first flexure element 31 is fixed to the case 2 at a portion of the beam portion 31a (i.e., at the boss 31c). The beam portion 31a is made of material having a predetermined stiffness property such that the first flexure element 31 is deformed within an elastic limit by the thrust force applied to the contact portion 31b.

The contact portion 31b is formed on radially inner side of the beam portion 31a, and the contact portion 31b comprises a contact face 31e that is brought into close contact to the housing washer 5b of the first thrust bearing 5. In the contact portion 31b, the contact face 31e is thus contacted closely to the housing washer 5b, but a back face 31f of the contact face 31e is not contacted to any member so that a clearance GP1 is maintained between the back face 31f and an opposing face 25c of a first load restricting mechanism 25. For example, an inner circumference of the contact portion 31b is splined to an outer circumference of the cylindrical portion 3a of the first rotor 3. Therefore, a rotation of the first flexure element 31 around the rotational axis AL is restricted, but the contact portion 31b is allowed to be moved along the rotational axis AL by the thrust force applied from the first thrust bearing 5 (or a reaction force against the thrust force acting in the direction from the first rotor 3 toward the second rotor 4).

The beam portion 31a and the contact portion 31b are formed integrally, and the first flexure element 31 is fixed to the case 2 at a portion of the beam portion 31a, that is, at the boss 31c. That is, the first flexure element 31 is a cantilever in which one end of the contact portion 31b side (i.e., an end portion of the rotational axis AL side in the vertical direction in FIG. 6) is a free end, and the other end of the beam portion 31a side (i.e., an end portion of the case 2 side in the vertical direction in FIG. 6) is a fixed end. In the first flexure element 15, when the contact portion 31b receives the thrust force applied to the first thrust bearing 5 from the first rotor 3, the beam portion 31a is subjected to a bending moment to be deformed elastically.

In order to detect a flexure or displacement of the first flexure element 31 deformed by the thrust force applied to the first thrust bearing 5 as a physical amount relating to the thrust force acting on the first thrust bearing 5, the first sensor element 32 is attached to the first flexure element 31. Specifically, the first sensor element 32 is attached to the beam portion 31a of the first flexure element 31 to detect a flexure or displacement of the beam portion 31a deformed by the bending moment. In the example shown in FIG. 6, a strain gauge is employed as the first sensor element 32. Specifically, the strain gauge outputs a voltage in proportion to a change amount of a resistance value which is changed in accordance with a flexure or distortion of the beam portion 31a. Instead, a piezoelectric element or a pressure sensor may also be used as the first sensor element 32.

The second flexure element 33 is fixed partially to the case 2, and elastically deformed by the thrust force (or a reaction force against the thrust force) applied to the second thrust bearing 6 from the second rotor 4. In the example shown in FIG. 6, the second flexure element 33 comprises a beam portion 33a and a contact portion 33b.

The beam portion 33a is an annular plate portion, and a boss 33c is formed on an outer circumferential portion of the beam portion 33a. The boss 33c is fixed to a joining section 26b of the second load restricting mechanism 26 through a thread. To this end, a thread ridge 33d is formed on an outer circumferential face of the boss 33c, and the thread ridge 33d is engaged with a thread groove 26e formed on the joining section 26b of the second load restricting mechanism 26. A main body 26a of the second load restricting mechanism 26 is fixed to the case 2. The beam portion 33a is made of material having a predetermined stiffness property such that the second flexure element 33 is deformed within an elastic limit by the thrust force applied to the contact portion 33b.

The contact portion 33b is formed on radially inner side of the beam portion 33a, and the contact portion 33b comprises a contact face 33e that is brought into close contact to the housing washer 6b of the second thrust bearing 6. In the contact portion 33b, the contact face 33e is thus contacted closely to the housing washer 6b, but a back face 33f of the contact face 33e is not contacted to any member so that a clearance GP2 is maintained between the back face 33f and an opposing face 26c of the second load restricting mechanism 26. For example, an inner circumference of the contact portion 33b is splined to an outer circumference of the cylindrical portion 4a of the second rotor 4. Therefore, a rotation of the second flexure element 33 around the rotational axis AL is restricted, but the contact portion 33b is allowed to be moved along the rotational axis AL by the thrust force applied from the second thrust bearing 6 in the direction from the first rotor 3 toward the second rotor 4.

The beam portion 33a and the contact portion 33b are formed integrally, and the second flexure element 33 is fixed to the case 2 at a portion of the beam portion 33a, that is, at the boss 33c. That is, the second flexure element 33 is a cantilever in which one end of the contact portion 33b side (i.e., an end portion of the rotational axis AL side in the vertical direction in FIG. 6) is a free end, and the other end of the beam portion 33a side (i.e., an end portion of the case 2 side in the vertical direction in FIG. 6) is a fixed end. In the second flexure element 33, when the contact portion 33b receives the thrust force applied to the second thrust bearing 6 from the second rotor 4, the beam portion 33a is subjected to a bending moment to be deformed elastically.

In order to detect a flexure or displacement of the second flexure element 33 deformed by the thrust force applied to the second thrust bearing 6 as a physical amount relating to the thrust force acting on the second thrust bearing 6, the second sensor element 34 is attached to the second flexure element 33. Specifically, the second sensor element 34 is attached to the beam portion 33a of the second flexure element 33 to detect a flexure or displacement of the beam portion 33a deformed by the bending moment. In the example shown in FIG. 6, a strain gauge is also employed as the second sensor element 34. Specifically, the strain gauge outputs a voltage in proportion to a change amount of a resistance value which is changed in accordance with a flexure or distortion of the beam portion 33a. Instead, a piezoelectric element or a pressure sensor may also be used as the second sensor element 34.

The first load restricting mechanism 25 serves as a stopper that restricts the thrust force acting on the first flexure element 31 of the detector 8. In other words, the first load restricting mechanism 25 defines an upper limit of the thrust force acting on the first flexure element 31 of the detector 8. In the example shown in FIG. 6, the first load restricting mechanism 25 is held in the hollow space of the case 2 on an opposite side of the first thrust bearing 5 in the axial direction AL across the first flexure element 31. The first load restricting mechanism 25 comprises the main body 25a, and the joining section 25b.

The main body 25a is a thick annular plate, and fixed to the case 2 in such a manner as not to move in the axial direction AL. Specifically, the main body 25a comprises the opposing face 25c opposed to the back face 31f of the contact portion 31b of the first flexure element 31, and an installation face 25d on which the radial bearing 12 is installed.

The opposing face 25c is formed on an outer circumferential portion of one end of the main body 25a (i.e., a left end in FIG. 6). The opposing face 25c is opposed to the back face 31f of the first flexure element 31 in a condition where the main body 25a and the first flexure element 31 are fixed to the case 2, so that the clearance GP1 is maintained between the back face 31f and the opposing face 25c. A width of the clearance GP1 is set in such a manner that the first flexure element 31 will not be deformed more than the elastic limit by the thrust force applied to the first flexure element 31 from the first rotor 3 and the first thrust bearing 5. Therefore, even if the first flexure element 31 is displaced in the axial direction AL by the thrust force while being deformed to a maximum extent until the back face 31f of the first flexure element 31 comes into contact to the opposing face 25c, such deformation of the first flexure element 31 is still within the elastic limit and hence the first flexure element 31 will not be deformed plastically.

The installation face 25d is formed on an inner circumferential face of the main body 25a, and the radial bearing 12 is fixed to the installation face 25d to support the first rotor 3. Specifically, the outer race 12a of the radial bearing 12 is pressed into the installation face 25d, and the cylindrical portion 3a of the first rotor 3 is pressed into the inner race 12b of the radial bearing 12.

The joining section 25b as a cylindrical portion is formed on an outer circumferential portion of one end of the main body 25a to protrude toward the opposing flange 3b of the first rotor 3.

The second load restricting mechanism 26 serves as a stopper that restricts the thrust force acting on the second flexure element 33 of the detector 8. In other words, the second load restricting mechanism 26 defines an upper limit of the thrust force acting on the second flexure element 33 of the detector 8. In the example shown in FIG. 6, the second load restricting mechanism 26 is held in the hollow space of the case 2 on an opposite side of the second thrust bearing 6 in the axial direction AL across the second flexure element 33. The second load restricting mechanism 26 comprises the main body 26a, and the joining section 26b.

The main body 26a is a thick annular plate, and fixed to the case 2 in such a manner as not to move in the axial direction AL. Specifically, the main body 26a comprises the opposing face 26c opposed to the back face 33f of the contact portion 33b of the second flexure element 33, and an installation face 26d on which the radial bearing 14 is installed.

The opposing face 26c is formed on an inner circumferential portion of one end of the main body 26a (i.e., a right end in FIG. 6). The opposing face 26c is opposed to the back face 33f of the second flexure element 33 in a condition where the main body 26a and the second flexure element 33 are fixed to the case 2, so that the clearance GP2 is maintained between the back face 33f and the opposing face 26c. A width of the clearance GP2 is set in such a manner that the second flexure element 33 will not be deformed more than the elastic limit by the thrust force applied to the second flexure element 33 from the second rotor 4 and the second thrust bearing 6. Therefore, even if the second flexure element 33 is displaced in the axial direction AL by the thrust force while being deformed to a maximum extent until the back face 33f of the second flexure element 33 comes into contact to the opposing face 26c, such deformation of the second flexure element 33 is still within the elastic limit and hence the second flexure element 33 will not be deformed plastically.

The installation face 26*d* is formed on an inner circumferential face of the main body 26*a*, and the radial bearing 14 is fixed to the installation face 26*d* to support the second rotor 4. Specifically, the outer race 14*a* of the radial bearing 14 is pressed into the installation face 26*d*, and the cylindrical portion 4*a* of the second rotor 4 is pressed into the inner race 14*b* of the radial bearing 14.

The joining section 26*b* as a cylindrical portion is formed on an outer circumferential portion of one end of the main body 26*a* to protrude toward the opposing flange 4*b* of the second rotor 4. As described, the thread groove 26*e* is formed on an inner circumferential face of a leading end portion of the joining section 26*b*, and the thread groove 26*e* is engaged with the thread ridge 33*d* formed on the outer circumferential face of the boss 33*c* of the second flexure element 33. Thus, the second flexure element 33 is fixed to the joining section 26*b* by engaging the thread ridge 33*d* of the second flexure element 33 with the thread groove 26*e* of the joining section 26*b*. That is, the second flexure element 33 is fixed to the case 2 at the boss 33*c* as a part of the beam portion 33*a* through the joining section 26*b* of the second load restricting mechanism 26.

A movement of the other end of the main body 26*a* of the second load restricting mechanism 26 in the axial direction AL is restricted by a fixing ring 26*f*. Specifically, the fixing ring 26*f* is a cylindrical member in which a thread ridge (not shown) is formed on an outer circumferential face of one end, and the thread ridge of the fixing ring 26*f* is engaged with a thread groove (not shown) formed on the inner circumferential face of the case 2. A flange 26*g* is formed on the other end of the fixing ring 26*f*, and the flange 26*g* is engaged with the case 2. Thus, the second load restricting mechanism 26 is retained in the case 2 by engaging the fixing ring 26*f* with the case 2.

In the example shown in FIG. 6, the preload mechanism 18 applies a preload as a thrust force to the second flexure element 33, in addition to the thrust force applied to the second flexure element 33 from the second rotor 4 through the second thrust bearing 6. In the example shown in FIG. 6, the preload mechanism 18 comprises the boss 33*c* of the second flexure element 33, and the joining section 26*b* of the second load restricting mechanism 26. Specifically, the thread ridge 33*d* formed on the boss 33*c* and the thread groove 26*e* formed on the joining section 26*b* serve as the preload mechanism 18. That is, the preload mechanism 18 is a feed screw mechanism.

In the action force detecting unit 1 shown in FIG. 6, therefore, a fixing position of the second flexure element 33 to the joining section 26*b* may be adjusted in the axial direction AL by rotating the joining section 26*b* on which the thread groove 26*e* is formed and the main body 26*a* (i.e., the second load restricting mechanism 26) around the rotational axis AL. That is, the thrust force (or the preload) may be applied to the second flexure element 33 in the axial direction AL by moving the fixing position of the second flexure element 33 to the joining section 26*b* toward the opposing flange 4*b* of the second rotor 4. In other words, the thrust force applied to the second flexure element 33 in the axial direction AL may be increased by moving the fixing position of the second flexure element 33 to the joining section 26*b* toward the opposing flange 4*b* of the second rotor 4. By contrast, the thrust force applied to the second flexure element 33 in the axial direction AL may be reduced by moving the fixing position of the second flexure element 33 to the joining section 26*b* toward the second load restricting mechanism 26. Thus, a magnitude of the thrust force applied as a preload to the second flexure element 33 may be adjusted by the preload mechanism 18.

The thrust force thus applied as a preload to the second flexure element 33 in the axial direction AL by the preload mechanism 18 may be further applied to the second thrust bearing 6 via the contact portion 33*b* of the second flexure element 33. That is, a pushing force may be applied to the second thrust bearing 6 in a direction to push the second thrust bearing 6 toward the opposing flange 4*b* of the second rotor 4. Consequently, an end play of the second thrust bearing 6 in the axial direction AL may be packed. In addition, an initial value or origin point for executing a calculation by the calculator 9 based on an output signal from the detector 8 may be adjusted by adjusting the thrust force applied as a preload to the second flexure element 33 by the preload mechanism 18.

Figure 8:
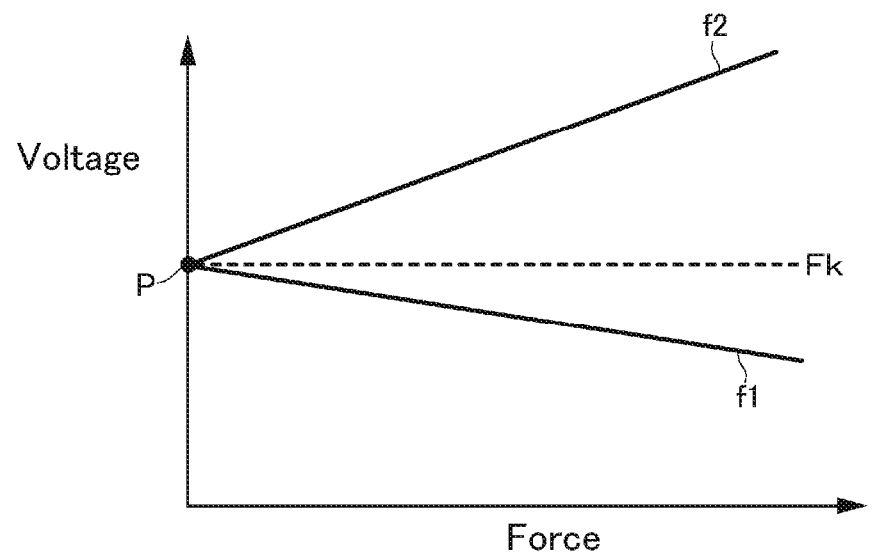
FIG. 8 shows an example of a map for calculating a torque and a lateral force acting on the tire by the calculator in the action force detecting unit shown in FIG. 6.

In order to calculate a lateral force and a torque acting on the tire 23 based on an output voltage of the strain gauge, in the action force detecting unit 1 shown in FIG. 6, a calculation map shown in FIG. 8 is installed in the calculator 9. In other words, FIG. 6 shows formulas represented by lines f1 and f2 installed in the calculator 9 to calculate a lateral force and a torque acting on the tire 23.

For example, given that an output voltage from the first sensor element 32 is F1 on the line f1, an output voltage from the second sensor element 34 is F1 on the line f2, and a voltage at an origin point P of the lines f1 and f2 is Fk, a lateral force Fl acting on the tire 23 is expressed as:

$$Fl = F2 - F1 \quad (1).$$

On the other hand, a torque Ft acting on the tire 23 is expressed as:

$$Ft = (F2 - Fk) + (F1 - Fk); \text{ namely,}$$

$$Ft = F2 + F1 \quad (2).$$

As described, in the action force detecting unit 1 shown in FIG. 6, the initial value or origin point for executing a calculation by the calculator 9 may be set by adjusting the thrust force applied to the second flexure element 33 of the detector 8 by the preload mechanism 18. Specifically, an initial value of the output signal from the detector 8, that is, the output voltage from the strain gauge can be adjusted to the origin point P shown in FIG. 8. For this reason, the lateral force and the torque acting on the tire 23 can be detected accurately.

In addition, in the action force detecting unit 1 shown in FIG. 6, both of the first rotor 3 and the second rotor 4 are provided with the detector 8. Specifically, the first rotor 3 is provided with the first flexure element 31 and the first sensor element 32, and the second rotor 4 is provided with the second flexure element 33 and the second sensor element 34. That is, the action force detecting unit 1 shown in FIG. 6 calculates the lateral force and the torque acting on the tire 23 based on the detection values of the first sensor element 32 and the second sensor element 34. As can be seen from FIG. 8, given that the lateral force acting on the tire 23 is zero, based on the expression (1), the output voltage F1 from the first sensor element 32 and the output voltage F2 from the second sensor element 34 are equalized to each other. In this case, based on the expression (2), the torque acting on the tire 23 is "F1·2" or "F2·2". Thus, a redundancy can be ensured between the first sensor element 32 and the second sensor element 34. For this reason, the torque acting on the tire 23 can be detected even in the event of failure of one of the first sensor element 32 and the second sensor element 34. That is, reliability of the action force detecting unit 1 can be improved.

As explained with reference to FIG. 7, the action force detecting unit 1 shown in any of FIGS. 1, 4, and 5 may be arranged between the vehicle body 22 of the vehicle 20 and the wheel rim 24 of the wheel 21. That is, the action force detecting unit 1 in which the detector 8 is arranged only in one of the first rotor 3 side and the second rotor 4 side may be arranged in the vehicle 20 to detect a torque acting on the tire 23.

What is claimed is:

1. An action force detecting unit for a rotary member that is arranged between a predetermined rotary member and a predetermined stationary member supporting the rotary member in a rotatable manner to detect a force acting on the rotary member, comprising:
    a first rotor that is connected to the rotary member to be rotated integrally with the rotary member;
    a second rotor that is arranged coaxially with the first rotor to be opposed to the first rotor while being allowed to rotate relatively to the first rotor;
    a supporting member that is fixed to the stationary member while supporting the first rotor and the second rotor respectively in a rotatable manner;
    a first thrust bearing that is interposed between the first rotor and the supporting member to support the first rotor by receiving a thrust force acting on the first rotor in a direction along a rotational center axis;
    a second thrust bearing that is interposed between the second rotor and the supporting member to support the second rotor by receiving a thrust force acting on the second rotor in the direction along the rotational center axis;
    a load translating mechanism that is arranged between the first rotor and the second rotor to be rotated integrally with the first rotor and the second rotor, so as to transmit a torque between the first rotor and the second rotor while translating the torque partially into a thrust force transmitted between the first rotor and the second rotor;
    a detector including
        a flexure element that is partially fixed to the supporting member, and that is deformed by at least any one of the thrust force acting on the first thrust bearing and the thrust force acting on the second thrust bearing, and
        a sensor element that is attached to the flexure element to detect a physical amount relating to the thrust force deforming the flexure element;
    a calculator that calculates the force acting on the rotary member based on the physical amount detected by the detector; and
    a transmitter that is arranged on the supporting member, and that transmits an output signal to the calculator in accordance with the physical amount detected by the detector, or to an external element in accordance with the force calculated by the calculator.

2. The action force detecting unit for a rotary member as claimed in claim 1,
    wherein the flexure element is elastically deformed by the thrust force applied to the second thrust bearing from the second rotor,
    the sensor element detects a flexure or a displacement of the flexure element being deformed,
    the second thrust bearing comprises a shaft washer rotated integrally with the second rotor, and a housing washer contacted to the flexure element,
    the sensor element is electrically connected to the calculator and the transmitter, and
    the calculator calculates a torque acting on the rotary member based on the flexure or the displacement detected by the sensor element.

3. The action force detecting unit for a rotary member as claimed in claim 1,
    wherein the flexure element includes
        a first flexure element that is partially fixed to the supporting member, and that is deformed by the thrust force applied to the first thrust bearing from the first rotor, and
        a second flexure element that is partially fixed to the supporting member, and that is deformed by the thrust force applied to the second thrust bearing from the second rotor,
    the sensor element includes
        a first sensor element that is attached to the first flexure element to detect a flexure or a displacement of the first flexure element being deformed, and
        a second sensor element that is attached to the second flexure element to detect a flexure or a displacement of the second flexure element being deformed,
    the first thrust bearing comprises a first shaft washer rotated integrally with the first rotor, and a first housing washer contacted to the first flexure element,
    the second thrust bearing comprises a second shaft washer rotated integrally with the second rotor, and a second housing washer contacted to the second flexure element,
    the first sensor element and the second sensor element are electrically connected respectively to the calculator and the transmitter, and
    the calculator calculates at least any one of the torque and the thrust force acting on the rotary member based on the flexures or the displacements detected by the first sensor element and the second sensor element.

4. The action force detecting unit for a rotary member as claimed in claim 2, further comprising:
    a load restricting mechanism that defines an upper limit of the thrust force acting on the flexure element.

5. The action force detecting unit for a rotary member as claimed in claim 3, further comprising:
    a first load restricting mechanism that defines an upper limit of the thrust force acting on the first flexure element; and
    a second load restricting mechanism that defines an upper limit of the thrust force acting on the second flexure element.

6. The action force detecting unit for a rotary member as claimed in claim 2, further comprising:
    a preload mechanism that applies a thrust force preliminary to the flexure element.

7. The action force detecting unit for a rotary member as claimed in claim 3, further comprising:
    a preload mechanism that applies a thrust force preliminary to the second flexure element.

8. The action force detecting unit for a rotary member as claimed in claim 2,
    wherein the first rotor is connected to a wheel of a vehicle on which a tire is mounted,
    the supporting member is fixed to a vehicle body of the vehicle, and the calculator calculates a torque acting on the tire based on the flexure or displacement detected by the sensor element.

9. The action force detecting unit for a rotary member as claimed in claim 3,
   wherein the first rotor is connected to a wheel of a vehicle on which a tire is mounted,
   the supporting member is fixed to a vehicle body of the vehicle, and
   the calculator calculates at least any one of a torque and a lateral force acting on the tire based on the flexures or the displacements detected by the first sensor element and the second sensor element.

10. The action force detecting unit for a rotary member as claimed in claim 4, further comprising:
    a preload mechanism that applies a thrust force preliminary to the flexure element.

11. The action force detecting unit for a rotary member as claimed in claim 5, further comprising:
    a preload mechanism that applies a thrust force preliminary to the second flexure element.

12. The action force detecting unit for a rotary member as claimed in claim 4,
    wherein the first rotor is connected to a wheel of a vehicle on which a tire is mounted,
    the supporting member is fixed to a vehicle body of the vehicle, and
    the calculator calculates a torque acting on the tire based on the flexure or the displacement detected by the sensor element.

13. The action force detecting unit for a rotary member as claimed in claim 6,
    wherein the first rotor is connected to a wheel of a vehicle on which a tire is mounted,
    the supporting member is fixed to a vehicle body of the vehicle, and
    the calculator calculates a torque acting on the tire based on the flexure or the displacement detected by the sensor element.

14. The action force detecting unit for a rotary member as claimed in claim 10,
    wherein the first rotor is connected to a wheel of a vehicle on which a tire is mounted,
    the supporting member is fixed to a vehicle body of the vehicle, and
    the calculator calculates a torque acting on the tire based on the flexure or the displacement detected by the sensor element.

15. The action force detecting unit for a rotary member as claimed in claim 5,
    wherein the first rotor is connected to a wheel of a vehicle on which a tire is mounted,
    the supporting member is fixed to a vehicle body of the vehicle, and
    the calculator calculates at least any one of a torque and a lateral force acting on the tire based on the flexures or the displacements detected by the first sensor element and the second sensor element.

16. The action force detecting unit for a rotary member as claimed in claim 7,
    wherein the first rotor is connected to a wheel of a vehicle on which a tire is mounted,
    the supporting member is fixed to a vehicle body of the vehicle, and
    the calculator calculates at least any one of a torque and a lateral force acting on the tire based on the flexures or the displacements detected by the first sensor element and the second sensor element.

17. The action force detecting unit for a rotary member as claimed in claim 11,
    wherein the first rotor is connected to a wheel of a vehicle on which a tire is mounted,
    the supporting member is fixed to a vehicle body of the vehicle, and
    the calculator calculates at least any one of a torque and a lateral force acting on the tire based on the flexures or the displacements detected by the first sensor element and the second sensor element.

* * * * *